United States Patent Office 3,097,098
Patented July 9, 1963

3,097,098
SHORTENING AND AGENT THEREFOR
Robert R. Allen, Richard J. Bell, and Ray B. Donohue, Jr., Sherman, Tex., assignors to Anderson, Clayton & Co., Houston, Tex., a corporation of Delaware
No Drawing. Filed June 30, 1960, Ser. No. 39,804
9 Claims. (Cl. 99—123)

The present invention relates to improvements in shortening and shortening agents used in shortening.

The present invention is particularly directed to edible shortenings and agents used in the preparation of baked goods, such as household and bakery cakes, cake mixes, as well as bread, rolls, buns, icings, cream fillings and the like. The description for the purpose of disclosure is therefore directed to such uses although other uses will occur to those in the art.

In the preparation of a cake using shortening as one of the ingredients, it is necessary during the batter preparation to incorporate the liquid ingredients into the dry material in the form of small droplets surrounded by a thin layer of fat and also to mix air in the form of tiny bubbles into the batter. This results in a cake of good volume and texture. To accomplish the formation of small air and liquid droplets, it is necessary to add a material that exhibits surface activity between the aqueous and fat surfaces. Many materials have been suggested for this use. For example, it is well known that the reaction product resulting from the reaction of an edible fat and glycerol when used as a shortening agent will effect a general increase in the quality of cakes as described in some detail in United States Patent No. 2,132,398. Other shortening agents have been proposed for this purpose such as glycerol lactyl palmitates as disclosed in United States Patent No. 2,690,971. While such materials produce cakes of acceptable volume and texture, they suffer from the disadvantage of using expensive materials in their preparation and some of those proposed require specialized equipment or processes for their preparation and some of them result in products of poor eating quality. Accordingly, it would be highly advantageous to provide a shortening agent that can be prepared by a simple process from inexpensive materials and a shortening incorporating such an agent, the use of which results in large amounts of liquid and air being incorporated into a cake batter in the form of small droplets thus giving baked goods of large volume and good grain, texture and eating quality.

There have been proposed normally liquid shortenings for use in the production of baked goods. These liquid shortenings, however, have not been satisfactory since the resulting cakes are of low volume and are tough, spongy and of gummy texture. It would be advantageous to provide a shortening agent and a normally liquid shortening containing such an agent which when used in the prepartion of cakes would result in a cake of large volume and good grain and texture.

The present invention is directed to the provision of such a shortening and shortening agent.

In one aspect of the present invention an edible shortening agent is prepared by an ester interchange reaction between a triglyceride fat and a glycol with or without added glycerine. The resulting reaction product is a complex mixture of esters such as mono-, di- and triglycerides and mono- and diesters of the glycol. During the ester interchange reaction the mono- and diglycerides result from the removal of acyl groups from the triglyceride fat and the glycol esters are thus formed from these acyl groups.

The relative amounts of propylene glycol and glycerine which are reacted with the fats to produce the shortening agent are determined primarily by the end use of the product. As shown in the following examples, the additive may be prepared by the addition of no free glycerine to the reaction mixture of fat and glycol and the glycerine moiety of the fat reacts to form monoglycerides in the presence of propylene glycol. Free glycerine may be added to produce somewhat more monoglycerides in the presence of propylene glycol.

The ratio of added or free glycerine to propylene glycol may preferably vary from 0 to 1 or from 1 to 1 by weight but may considerably exceed this ratio, if desired. The weight of free polyols to fat may vary over a wide range. In commercial practice, the ratio of mixed polyols to fat of 1 to 1 is presently preferred, although the ratio may be increased or decreased, as desired.

Unexpectedly this reaction product when incorporated into a shortening performs more effectively during the prepartion of bakery products than conventional mixtures of mono- and diglycerides prepared in a similar way with glycerine being the only polyol added. This is unexpected since the shortening agent of the present invention has a monoglyceride content considerably less than the conventional mono- and diglyceride mixtures. Heretofore, it was believed the "activity" of such preparations was due almost entirely to the monoglycerides. However, the shortening agent of the present invention and shortening incorporating this agent gives superior results compared to mono- and diglyceride mixtures when used in the same weight percentage of the shortening although the shortening agent and shortening may contain less than half the monoglycerides compared to the conventional mono- and diglyceride mixtures.

It is therefore an object of the present invention to provide an edible shortening agent and a shortening incorporating such an agent which is relatively inexpensive, and easily prepared and when used in bakery products results in a bakery product of exceptional volume, texture, eating quality, storage stability and shelf life.

Still a further object of the present invention is the provision of an improved edible shortening additive and shortening by the use of which superior cakes, icings, cream fillings and the like are produced.

Still a further object of the present invention is the provision of an edible shortening agent and a shortening incorporating such an agent which when used in the preparation of icings and fillings results in greater volume and better texture, body, stability and eating quality.

Yet a further object of the present invention is the provision of an edible shortening agent and shortening incorporating such an additive which is more economical to produce than other similar materials such as mono- and diglyceride mixtures and in which the processing is simpler and more economical since the reaction is carried out in conventional processing equipment and as a homogeneous mixture compared to others which are non-homogeneous mixtures.

Yet a further object of this invention is the provision of an improved edible shortening agent and normally liquid shortening containing this agent which can successfully be used in producing cakes, icings, cream fillings and the like of large volume, good texture and eating quality.

Still a further object of the present invention is the provision of such an edible shortening agent and shortening which may be incorporated into so-called "prepared mix" type cakes to produce high quality cakes in which all of the liquid to the dry ingredients of the cake may be added at one time and after a short mixing period the cake is ready to bake providing excellent large volume cakes of good grain and texture rather than requiring the addition of the liquid to the dry ingredients in at least two stages with a mixing period after each liquid addition as in conventional shortenings containing mixtures of mono- and diglycerides which produce lower quality cakes.

Other and further objects, features and advantages of the invention will be apparent from the following description of presently-preferred embodiments of the invention given for the purpose of disclosure.

The edible shortening agent of the present invention, as previously mentioned, is a composition of matter resulting from the reaction of an edible fat and propylene glycol with or without adding glycerine by an ester interchange process. The excess reactants are removed and the composition is then mixed with an edible fat to form a shortening which has special utility for the preparation of bakery goods, such as bread, rolls, buns, cakes, icings, cream fillings and the like. The edible shortening agent is a reaction product comprising a predetermined complex mixture of esters such as mono-, di- and triglycerides and mono- and diesters of the glycol. In the ester interchange reaction the propylene glycol is reacted as the monomer. Thus, the resulting shortening agent is an edible fat, the glycerides of which are interesterified with propylene glycol and in which the monoglycerides may be increased by carrying out the reaction in the presence of glycerine. Excess reactants are removed and the finished shortening agent consists essentially of reacted materials although other and unreacted materials may be present, if desired.

Any desired fat, either hydrogenated or unhydrogenated, such as tallow, lard, peanut oil, cottonseed oil, soybean oil and the like may be used. In addition, any desired ester interchange catalyst may be used, for example, alcoholates and hydroxides of the alkali and alkaline earth metals, such as sodium hydroxide, potassium hydroxide, calcium hydroxide, calcium carbonate, sodium methoxide and the like.

Any desired ester interchange reaction temperature and pressures may be utilized as desired.

Any desired amount of the shortening additive may be incorporated in a shortening base stock. The presently-preferred range is of the order of about 5% to about 30% of the shortening agent, although the range may be increased or decreased, as desired. The presently-preferred range of shortening agent is from 5% to 15%.

The following examples are illustrative of edible shortening agents and shortenings incorporating such an agent according to the present invention. It will be appreciated, of course, that the proportions of reacting ingredients, times of reaction, temperatures of reaction, catalyst and fats are somewhat variable. In the examples all percentages given are by weight.

EXAMPLE I 339 pounds of propylene glycol (33.9%), 113 pounds of anhydrous glycerine (11.3%), and one-half pound of sodium hydroxide (0.05% on the basis of total reactants) were heated together until the sodium hydroxide had dissolved. 548 pounds of hydrogenated tallow (54.8%) was then added and the mixture heated to 180° centigrade and held at that temperature for one hour at which time the heating was discontinued. Sufficient phosphoric acid was then added to neutralize the caustic and excess propylene glycol and glycerine were removed by vacuum distillation. The residue from the distillation (634 pounds) was a white waxy solid containing 21.0% alpha monoglycerides of tallow fatty acids.

This shortening agent was then mixed with a shortening base stock consisting of partially hydrogenated soybean oil and several levels of the shortening agent ranging from 5% to 15% were tested in cakes with various ratios of sugar to flour of 110% to 125%. The cakes were then compared to cakes prepared by the use of a shortening agent prepared by the glycerolysis of a triglyceride without propylene glycol comprising a commercial mixture of mono- and diglycerides added at the same levels. The commercial mixture is described in U.S. Patent 2,132,398 previously mentioned.

The results of the comparison are set forth in the following table. In the following table the shortening agent according to the present invention is identified as "New Shortening Agent" and the conventional shortening agent is identified as "Mono- and Diglycerides."

Table I

| Type of Additive | Percent Added | Type of Test Cake | Vol., cc./100 g. | Grain | Texture |
|---|---|---|---|---|---|
| New shortening Agent | 5 | White Layer | 295 | Excellent | Excellent |
| Mono and Diglycerides (42% Monoglyceride) | 5 | ---do--- | 283 | Good | Good |
| New Shortening Agent | 7.5 | Prepared Mix | 328 | Excellent | Excellent |
| Mono and Diglycerides (42% Monoglyceride) | 7.5 | ---do--- | 287 | Fair | Fair |
| New Shortening Agent | 15 | ---do--- | 350 | Excellent | Excellent |
| Mono and Diglycerides (42% Monoglyceride) | 15 | ---do--- | 243 | Fair | Fair |

The data in the above table clearly indicate that the volume, grain and texture of the test cake was considerably better when using the shortening agent according to the present invention than the conventional mono- and diglyceride mixture.

EXAMPLE II

In this example 351 grams of propylene glycol (35.1%) and 2 grams of sodium hydroxide (0.2%) were heated until the sodium hydroxide had dissolved. At that time 649 grams of hydrogenated tallow (64.9%) were added and the mixture was heated to 180° C. and held at that temperature for 1 hour at which time the heating was discontinued. The caustic was neutralized with phosphoric acid and free glycerine and propylene glycol were removed by vacuum distillation. The resulting edible shortening agent weighed 740 grams and contained 16.2% total monoglycerides and was a white waxy solid. This shortening agent was tested by preparing a shortening comprised of partially hydrogenated soybean oil base stock in which 7.5% by weight of this agent was dissolved, which shortening was used in the preparation of prepared mix type cakes. The specific volume of the cake was 285 cc. per 100 grams and had excellent grain and texture compared to the specific volume of 240 cc. per 100 grams when utilizing the same shortening base containing 7.5% of a mixture of mono- and diglycerides, which contained about 41% alpha monoglycerides, as described in Example I.

EXAMPLE III

In this example the edible shortening agent was prepared by the reaction of 1,370 grams of hydrogenated fat (68.4%), 316 grams of propylene glycol (15.8%), 316 grams of glycerine (15.8%) and 2 grams sodium hydroxide (0.1%). After neutralization of the caustic and removal of the free propylene glycol and glycerine, a hard waxy solid was obtained which contained 29.4% total monoglyceride. A liquid shortening was prepared by the addition of 5% of this material to cottonseed oil. White layer cakes using this liquid shortening had a specific volume of 275 cc. per 100 grams and had excellent grain and texture compared to 250 cc. per 100 grams specific volume of cakes made using a shortening consisting of cottonseed oil containing 5% of a conventional mixture of mono- and diglycerides of hydrogenated fat made as described in Example I.

EXAMPLE IV

In this example a shortening agent according to the invention was prepared by the reaction of 620 grams of hydrogenated peanut oil (62.0%), 75 grams of glycerine (7.5%), 305 grams propylene glycol (30.5%) and 1 gram of sodium hydroxide (0.1%). After neutralization of the caustic with phosphoric acid and removal of the free glycerine and propylene glycol by vacuum distillation the shortening agent was found to contain 22.9% total monoglycerides of peanut oil fatty acids. The shortening agent was then mixed with a plastic shortening base comprising partially hydrogenated soybean oil at a level of 7.5% and tested in prepared mix type layer cakes and compared to a shortening prepared by the addition of 7.5% of a mixture of mono- and diglycerides made as described in Example I. The specific volume of the cake using the shortening additive of the present invention was 329 cc. per 100 grams while the cake containing the shortening containing only mono- and diglycerides had a specific volume of 235 cc. per 100 grams. This constituted an increase in cake volume of 40%.

EXAMPLE V

The following is the prepared mix test cake used to evaluate the different shortenings in the preceding examples.

|  | Percent |
|---|---|
| Cake flour | 39.90 |
| Powdered sugar | 43.55 |
| Non-fat milk | 3.50 |
| Salt | 1.00 |
| Baking powder | 2.05 |
| Shortening | 10.00 |
|  | 100.00 |

In mixing the cake, to 20 ounces of the above mix, 1 and ¼ cups of water (294 grams) and two egg whites (66 grams) were added all at once in a household type mixing bowl. These were blended one minute at speed 1, then mixed four minutes at speed 6. 450 grams of batter were scaled into a 9 inch layer cake pan and baked at 360° F. for 20–25 minutes.

EXAMPLE VI

In this example a shortening agent for use in cream fillings was prepared by the reaction of 1,096 grams (54.8%) refined soybean oil, 226 grams (11.3%) glycerine and 678 grams (33.9%) propylene glycol and 1 gram (.05%) potassium hydroxide. After the eraction was completed, the catalyst was neutralized with phosphoric acid and the excess reactants removed. The product was a limpid oil and contained 23.2% alpha monoglycerides of soybean oil fatty acids. The product was mixed with a partially hydrogenated soybean oil base and was used to prepare a cream filling.

The objective in a cream filling is to achieve a product with the lowest possible specific gravity (therefore, the greatest unit volume) with very little, if any, bleeding out of the water on prolonged storage.

In the following example, the replacement of a portion of the monoglycerides with the shortening agent resulted in a cream filling with greater volume, better texture, and greater resistance to breakdown.

(a) Composition of shortening—18% monoglycerides in a partially hydrogenated soybean base.
   Cream filling prepared from the shortening:
       Specific gravity _____ 0.61 gm./cc.
       Specific volume _____ 164 cc./100 gm.
       Stability _____ Good.
(b) Composition of shortening—8% monoglycerides plus 10% shortening agent prepared from soybean oil in partially hydrogenated soybean base.
   Cream filling prepared from the shortening:
       Specific gravity _____ 0.52 gm./cc.
       Specific volume _____ 192 cc./100 gm.
       Stability _____ Excellent.

*Cream Filling Formula*

| Shortening | pounds | 1 |
| Powdered sugar | do | 2 |
| Dry milk powder | ounces | 5 |
| Salt | do | ¼ |
| Water | pounds | 1 |

Add water in three equal portions—blend 1 minute at low speed and mix 10 minutes at high speed after each addition.

EXAMPLE VII

A shortening additive was prepared from hydrogenated soybean oil according to Example I and mixed with a shortening base stock of hydrogenated vegetable oil at a level of 7.5%. A prepared mix cake using this shortening had a volume of 323 cc./100 grams compared to the cake using 7.5% of the previously-described commercial monoglycerides which had a volume of 235 cc./100 grams.

EXAMPLE VIII

It is possible with the new additive to decrease the amount of shortening in a cake and retain the large volume, eating quality and overall high quality of a prepared mix cake.

The shortening agent described in Example I was mixed with a partially hydrogenated vegetable oil shortening base at a level of 30%. The prepared mix cakes using only 6% shortening instead of the usual 10% had a volume of 352 cc./100 grams and were of excellent overall quality.

EXAMPLE IX

The type of shortening base used to prepare the new shortening containing the new shortening agent does not affect the results of the performance in baked products as shown in the following table.

The new agent was described in Example I and is compared to the previously-described commercial mono- and diglyceride mixtures in a standard white layer cake.

| Type of Additive | Shortening Base Stock | Volume, cc./100 g. | Quality |
|---|---|---|---|
| 8% New Agent | Lard—Tallow base | 349 | excellent. |
| 8% Mono and diglycerides. | do | 306 | good. |
| 8% New Agent | Partially hydrogenated Cottonseed Oil. | 340 | excellent. |
| 8% Mono and diglycerides. | do | 310 | good. |

Certain of the advantages of the present invention are clearly shown in the preceding examples by the superior cakes, icings and fillings produced by the use of the edible shortening agent and shortening containing it. Also, as previously mentioned, the edible shortening agent is much more economical to produce than other similar materials, such as mono- and diglyceride mixtures because propylene glycol is much cheaper than glycerine. Also, the manufacturing process is more economical and also is simpler since the reaction is carried out in a homogeneous mixture compared to the usual glycerolysis which is a non-homogeneous mixture because of the low solubility of glycerine in fat. In addition, the present invention has special utility when used in shortening that is incorporated in the so-called "prepared mix" type cakes in that it is possible to add all of the liquid to the dry ingredients of the cake at one time and after a short mixing period the cake is ready to bake by which an excellent large volume cake of good grain, texture and eating quality is produced; whereas, in using the conventional mixtures of mono- and diglycerides in the preparation of "prepared mix" cakes, the liquid must be added to the dry ingredients in at least two stages with a mixing period after each liquid addition and the cake is of lower quality, volume and eating quality than the cake produced by the use of a shortening and additive of the present invention. Also, advantageously, the edible shortening additive has a considerable effect on the shortening properties of liquid oils when used as the shortening in baked goods.

Prior to the present development it has not been possible to prepare a satisfactory cake using a liquid oil as the shortening. This is true even though the oil is mixed with large amounts of mono- and diglycerides since the resulting semi-liquid shortenings when used in cakes result in a cake of low volume and tough, spongy and gummy texture. The edible shortening additive of the present invention, however, when mixed with a liquid oil even at very low levels, for example 5%, results in a liquid shortening of unusual properties in that cakes made using this liquid shortening are very light with large volume and have a grain and texture indistinguishable or better than cakes made with conventional plastic shortenings.

As previously mentioned, the present invention is advantageous when applied to icings and fillings in that icings and fillings of greater volume and better texture, body, stability and eating quality are produced.

The present invention, therefore, is well suited and adapted to attain the objects and ends and has the advantages mentioned as well as others inherent therein.

While only presently preferred embodiments of the invention have been given for the purpose of disclosure, numerous changes may be made therein which are within the spirit of the invention as defined by the scope of the appended claims.

What is claimed is:

1. An edible shortening agent when combined with an edible shortening base forming a shortening, said shortening agent comprising a reaction product resulting from an ester interchange reaction of glycerides of an edible fat, propylene glycol and glycerine.

2. An edible shortening agent when combined with an edible shortening base forming a shortening, said shortening agent consisting of an edible fat, the triglycerides of which are interesterified with propylene glycol and glycerine.

3. An edible shortening agent when combined with an edible shortening base forming a shortening, said shortening agent comprising a completely interesterified mixture of glycerides of an edible fat, propylene glycol and glycerine.

4. A shortening effective for the production of baked goods, icings, fillings and the like comprising, an edible shortening containing dissolved therein from about five percent to about thirty percent, by weight of the shortening as a whole, of an edible fat comprising partial esters of propylene glycol and partial esters of glycerine.

5. A shortening effective for the production of baked goods, icings, fillings and the like comprising, an edible shortening containing dissolved therein from about five percent to about thirty percent, by weight of the shortening as a whole, of an edible fat, the glycerides of which are interesterified with propylene glycol and glycerine.

6. A normally liquid shortening comprising, a normally liquid edible glyceride oil containing dissolved therein from about five percent to about thirty percent, by weight of the shortening as a whole, of an edible fat comprising partial esters of propylene glycol and partial esters of glycerine.

7. A normally liquid shortening comprising, a normally liquid edible glycerine oil containing dissolved therein from above five percent to about thirty percent, by weight of the shortening as a whole, of an edible fat, the glycerides of which are interesterified with propylene glycol and glycerine.

8. A shortening comprising, an edible shortening base and an edible fat comprising partial esters of propylene glycol and partial esters of glycerine.

9. A shortening comprising, an edible shortening base and an edible fat, the glycerides of which are interesterified with propylene glycol and glycerine.

References Cited in the file of this patent

UNITED STATES PATENTS

| | | |
|---|---|---|
| 2,508,393 | Jaeger | May 23, 1950 |
| 2,532,523 | Trempel | Dec. 5, 1950 |
| 2,913,342 | Cameron et al. | Nov. 17, 1959 |